(12) United States Patent
Eguchi et al.

(10) Patent No.: US 11,135,975 B2
(45) Date of Patent: Oct. 5, 2021

(54) PERIPHERY MONITORING DEVICE, WORK MACHINE, PERIPHERY MONITORING CONTROL METHOD, AND DISPLAY DEVICE

(71) Applicant: Komatsu Ltd., Tokyo (JP)

(72) Inventors: Taro Eguchi, Tokyo (JP); Takeshi Kurihara, Tokyo (JP); Masaomi Machida, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/650,182

(22) PCT Filed: Feb. 19, 2019

(86) PCT No.: PCT/JP2019/006045
§ 371 (c)(1),
(2) Date: Mar. 24, 2020

(87) PCT Pub. No.: WO2019/167718
PCT Pub. Date: Sep. 6, 2019

(65) Prior Publication Data
US 2020/0384918 A1 Dec. 10, 2020

(30) Foreign Application Priority Data
Feb. 28, 2018 (JP) .............................. JP2018-035844

(51) Int. Cl.
*B60R 1/00* (2006.01)
*E02F 9/26* (2006.01)
*H04N 7/18* (2006.01)

(52) U.S. Cl.
CPC .................. *B60R 1/00* (2013.01); *E02F 9/26* (2013.01); *H04N 7/183* (2013.01);
(Continued)

(58) Field of Classification Search
None
See application file for complete search history.

(56) References Cited

U.S. PATENT DOCUMENTS 7,472,051 B2 * 12/2008 Mariani .................. G06F 11/27
703/13
10,228,454 B2 * 3/2019 Uotsu .................... G01S 13/931
(Continued)

FOREIGN PATENT DOCUMENTS

| JP | 2007261532 | 10/2007 |
| JP | 2008114814 | 5/2008 |

(Continued)

*Primary Examiner* — Chikaodili E Anyikire
(74) *Attorney, Agent, or Firm* — Fish & Richardson P.C.

(57) ABSTRACT

A periphery monitoring device includes cameras that detects a periphery of a hydraulic shovel, a periphery monitoring monitor that displays a bird's-eye image based on image information acquired by the cameras, and a state switching control unit that controls mode switching between a periphery monitoring mode and a monitoring pause mode. The state switching control unit transitions to the periphery monitoring mode in a case where an input of a key-on manipulation with respect to the hydraulic shovel is received in the monitoring pause mode. In the monitoring pause mode, it is possible to transition to the periphery monitoring mode in time faster than transition from a power-OFF state.

9 Claims, 7 Drawing Sheets

(52) U.S. Cl.
CPC ....... *B60R 2300/10* (2013.01); *B60R 2300/20* (2013.01); *B60R 2300/607* (2013.01)

(56) References Cited

U.S. PATENT DOCUMENTS

| | | | |
|---|---|---|---|
| 10,570,587 B2* | 2/2020 | Kurokami | G06K 9/00228 |
| 2005/0071064 A1* | 3/2005 | Nakamura | F04B 17/05 |
| | | | 701/50 |
| 2006/0025914 A1* | 2/2006 | Buschmann | E02F 9/26 |
| | | | 701/50 |
| 2008/0077786 A1* | 3/2008 | Pierce | G06F 9/4405 |
| | | | 713/2 |
| 2015/0163101 A1* | 6/2015 | Watanabe | G08C 17/02 |
| | | | 709/223 |
| 2015/0170441 A1 | 6/2015 | Kimura | |
| 2015/0183370 A1* | 7/2015 | Nakanishi | B60R 1/00 |
| | | | 348/148 |
| 2017/0089042 A1* | 3/2017 | Machida | G06K 9/00805 |
| 2017/0284069 A1 | 10/2017 | Machida et al. | |
| 2019/0352885 A1* | 11/2019 | Kurokami | B66C 23/88 |
| 2020/0277757 A1* | 9/2020 | Kurokami | E02F 9/24 |

FOREIGN PATENT DOCUMENTS

| | | |
|---|---|---|
| JP | 2018129743 | 8/2018 |
| WO | 2015025367 | 2/2015 |
| WO | 2016159012 | 10/2016 |

* cited by examiner

PERIPHERY MONITORING DEVICE, WORK MACHINE, PERIPHERY MONITORING CONTROL METHOD, AND DISPLAY DEVICE

CROSS-REFERENCE TO RELATED APPLICATIONS

This application is a National Stage application under 35 U.S.C. § 371 of International Application No. PCT/JP2019/006045, filed on Feb. 19, 2019, which claims priority to Japanese Patent Application No. 2018-035844, filed on Feb. 28, 2019. The contents of the prior applications are incorporated herein in their entirety.

TECHNICAL FIELD

The present invention relates to a periphery monitoring device, a work machine, a periphery monitoring control method, and a display device.

BACKGROUND ART

PLT 1 discloses a periphery monitoring device which generates a bird's-eye image by composing images of a plurality of cameras installed in a vehicle body of a hydraulic shovel and which displays the bird's-eye image on a monitor. In addition, PLT 1 discloses display of reference information which enables work efficiency to be improved, in addition to the above-described bird's-eye image.

CITATION LIST

Patent Literature

[PTL 1] PCT International Publication No. WO2016/159012

DISCLOSURE OF INVENTION

Technical Problem

However, there is a system which operates on a general-purpose operating system (hereinafter, also referred to as a "general-purpose OS") among systems which are mounted on a work machine. The general-purpose OS is an operating system for operating an application which can be used for various general-purpose objectives. The general-purpose OS has high processing performance and a large variety of functions, compared to a high real-time operating system (hereinafter, referred to as a "real-time OS"). In contrast, the general-purpose OS has disadvantages in that several dozens of seconds is required from start to completion of activation.

For example, in a case where the above-described periphery monitoring device is a program which operates on a general-purpose OS and other components (an engine controller, a pump controller, and the like) operate on the real-time OS, the following problems occur. That is, in a case where an operator of the work machine turns on an ignition key of the work machine, the respective components mounted on the work machine simultaneously start activation processes, respectively. Here, although the components which operate on the real-time OS immediately complete the activation and become operable states, the periphery monitoring device which operates on the general-purpose OS requires a time of several dozens of seconds until completing the activation and becoming the operable state. It is recommended that the operator performs a work after checking that the activation of the periphery monitoring device is completed and circumference of the work machine is safe.

Normally, the operator of the work machine turns off the ignition key of the work machine in a case of a lunch break for approximately one hour. In a case where the work machine is totally stopped, power supply to the periphery monitoring device is also cut off, and thus the periphery monitoring device is turned power OFF. If so, even in a case where the operator turns on the ignition key to restart the work after the lunch break, the operator waits for several dozens of seconds to activate the periphery monitoring device, and thus deterioration of work efficiency is concerned.

An object of the present invention is to provide a periphery monitoring device, a work machine, a periphery monitoring control method, and a display device, which are capable of improving the work efficiency by the work machine.

Solution to Problem

An aspect of the present invention provides a periphery monitoring device including: a detection device configured to detect a periphery of a work machine; an output device configured to perform a predetermined output based on a signal from the detection device; a periphery monitoring mode in which an operating system is being activated and a periphery monitoring process based on the detection device and the output device is performed on the operating system, a monitoring pause mode in which the periphery monitoring process is not performed while maintaining a state in which the operating system is being activated, a power-OFF state in which the operating system is not activated and the periphery monitoring process is not performed; and a state switching control unit that controls state switching between the periphery monitoring mode, the monitoring pause mode, and the power-OFF state.

Advantageous Effects of Invention

According to the aspect, it is possible to improve work efficiency by a work machine.

BEST MODE FOR CARRYING OUT THE INVENTION

First Embodiment

Hereinafter, a periphery monitoring device according to a first embodiment and a hydraulic shovel, on which the periphery monitoring device is mounted, will be described in detail with reference to FIGS. 1 to 7.

(Whole Configuration of Hydraulic Shovel)

Figure 1:
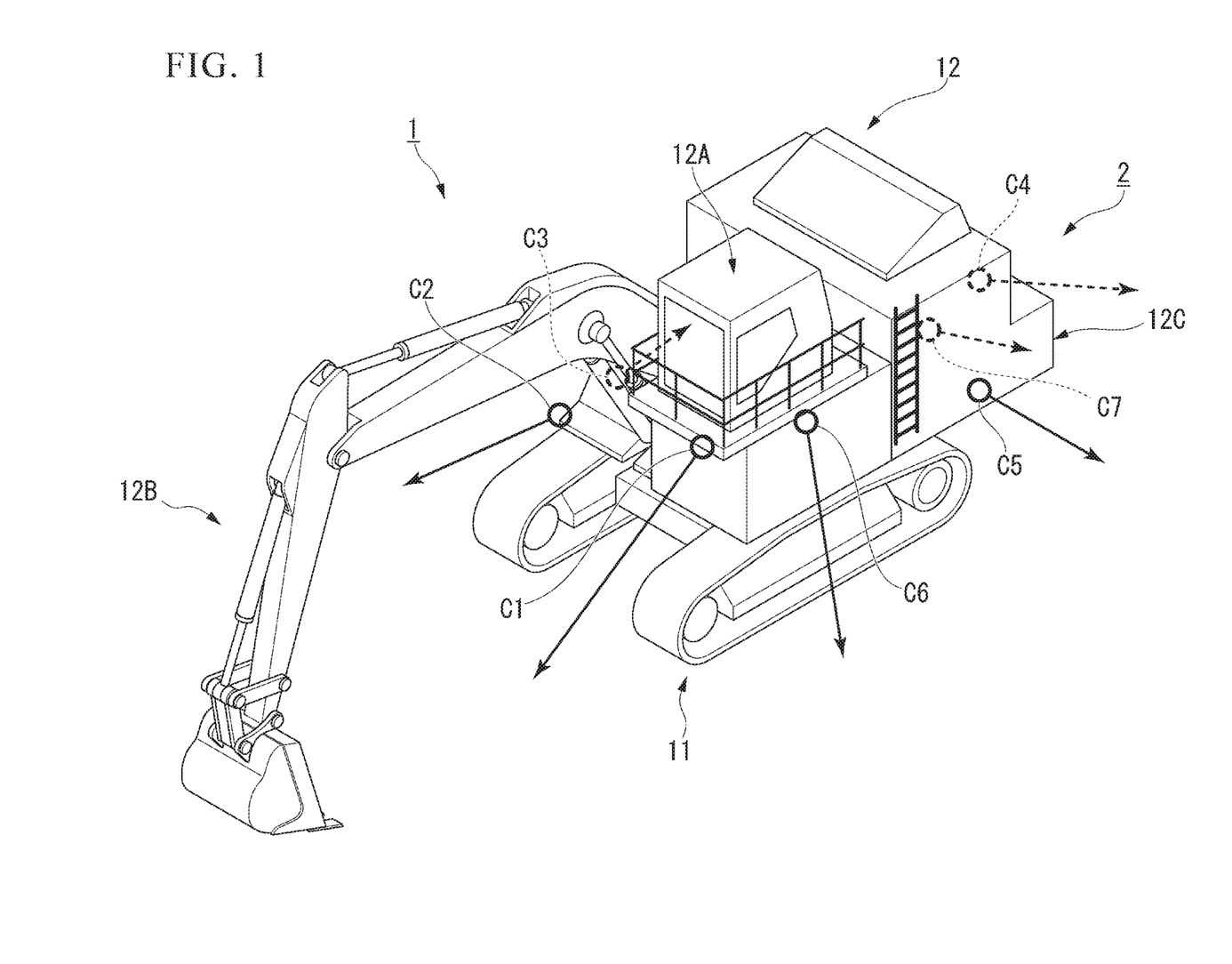
FIG. 1 is a diagram showing a whole configuration of a hydraulic shovel according to a first embodiment.

FIG. 1 is a diagram showing a whole configuration of the hydraulic shovel according to the first embodiment.

A hydraulic shovel 1 is an aspect of a work machine, and is a large hydraulic shovel, such as a mining shovel, which is used in a mine or the like.

As shown in FIG. 1, the hydraulic shovel 1 includes an undercarriage 11 for travel, and an upper swing body 12 which is installed at an upper part of the undercarriage 11 to be swivel. In addition, the upper swing body 12 is installed with a cab 12A, a work equipment 12B, a counterweight 12C, and the like.

The cab 12A is a place on which an operator of the hydraulic shovel 1 gets and in which a manipulation is performed. The cab 12A is installed at a left-side portion of a front end part of the upper swing body 12. A detailed configuration of the cab 12A will be described later.

The work equipment 12B includes a boom, an arm, and a bucket. The boom is mounted on a front end part of the upper swing body 12. In addition, the arm is attached to the boom. In addition, the bucket is attached to the arm. In addition, a boom cylinder is attached between the upper swing body 12 and the boom. In a case where the boom cylinder is driven, it is possible to operate the boom with respect to the upper swing body 12. An arm cylinder is attached between the boom and the arm. In a case where the arm cylinder is driven, it is possible to operate the arm with respect to the boom. A bucket cylinder is attached between the arm and the bucket. In a case where the bucket cylinder is driven, it is possible to operate the bucket with respect to the arm.

The hydraulic shovel 1 includes a periphery monitoring device 2. The periphery monitoring device 2 supports monitoring of a periphery of the hydraulic shovel 1 by the operator through a plurality of cameras and a plurality of radars, which are attached to a housing of the hydraulic shovel 1. The periphery of the hydraulic shovel 1 includes an entire circumference of the hydraulic shovel 1 and a partial area of the entire circumference.

The upper swing body 12 is installed with a plurality of cameras C1 to C7.

The camera C1 is provided at a lower part of the cab 12A on a front surface of the upper swing body 12 and takes images of a front side of the upper swing body 12. The camera C2 is provided at a lower part of a right front side of the upper swing body 12, and takes images of the right front side of the upper swing body 12. The camera C3 is provided at a lower part of a right side surface of the upper swing body 12 and takes images of a right back side of the upper swing body 12. The camera C4 is provided at a center of the lower part of a back side end of the counterweight 12C disposed at a rear end part of the upper swing body 12 and takes images of a back side of the upper swing body 12. The camera C5 is provided at a lower part of a left side surface of the upper swing body 12 and takes images of a left back side of the upper swing body 12. The camera C6 is provided on the left side surface of the upper swing body 12 and takes images of a left front side of the upper swing body 12. The camera C7 is provided at a lower base end of the counterweight 12C and takes images of a lower part area of the counterweight 12C. The cameras C1 to C7 are disposed to overlap photographing areas of the adjacent cameras C1 to C7 with each other. Therefore, it is possible to simultaneously take images of a periphery of 360° of the hydraulic shovel 1. Taking images by the cameras C1 to C7 is one of aspects of detection.

In addition, although not shown in FIG. 1, the plurality of radars (radars R shown in FIG. 3), which are capable of detecting an obstacle or the like located in a vicinity of the hydraulic shovel 1, are attached to the hydraulic shovel 1.

(Configuration of Cab of Hydraulic Shovel)

Figure 2:
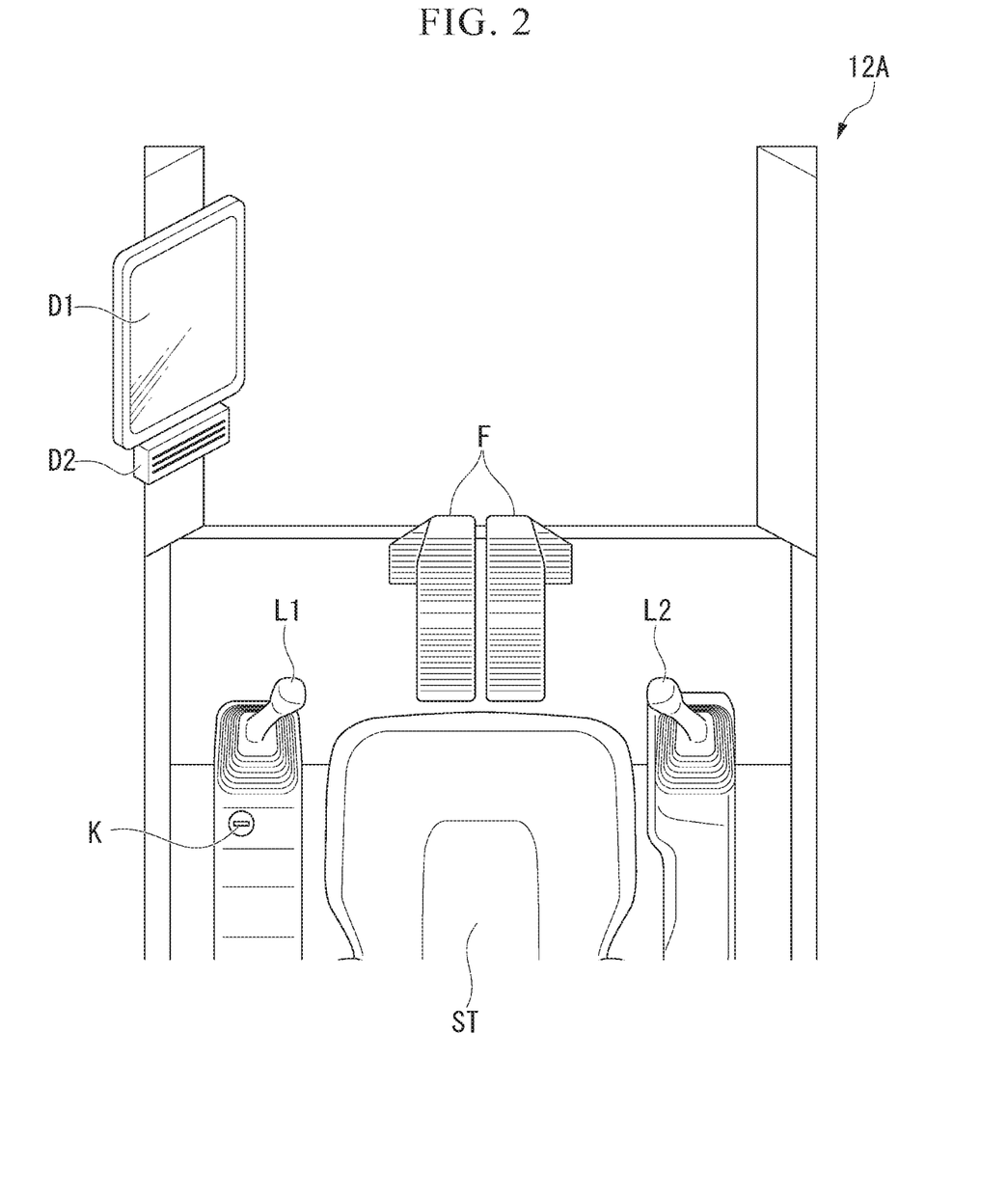
FIG. 2 is a diagram showing a configuration of a cab of the hydraulic shovel according to the first embodiment.

FIG. 2 is a diagram showing a configuration of the cab of the hydraulic shovel according to the first embodiment.

Manipulation levers L1 and L2 are disposed on right and left sides of an operator seat ST in the cab 12A. Due to the manipulation levers L1 and L2, it is possible to perform a swing operation of the upper swing body 12 and operations of the boom, the arm, and the bucket of the work equipment 12B.

A periphery monitoring monitor D1 and a buzzer D2 are disposed in the cab 12A. The periphery monitoring monitor D1 is an input and output device on which a touch sensor-type display is mounted. On the periphery monitoring monitor D1, single camera images acquired by the cameras C1 to C7, a bird's-eye image generated based on the images captured by the cameras C1 to C7, and the like are displayed. In addition, on the periphery monitoring monitor D1, a manipulation panel or the like for receiving various manipulations of the operator is displayed. The various manipulations of the operator include, for example, a camera image switching manipulation, an image size changing manipulation, and the like.

The buzzer D2 is alarmed in a case where the obstacle is detected by the radars R. Note that, in a case where the obstacle is detected, information of the obstacle is also displayed on the above-described periphery monitoring monitor D1.

An ignition key K is disposed at a left side part of the operator seat ST. The operator who gets on the hydraulic shovel 1 initially turns on the ignition key K, that is, performs a key-on manipulation. Therefore, an entire system, which includes an engine, a pump, a periphery monitoring device, and the like, of the hydraulic shovel 1 is activated. In addition, in a case where work is suspended or ended, the ignition key K is turned off, that is, a key-off manipulation is performed, and an operation of the entire system of the hydraulic shovel 1 is stopped.

(Functional Configuration of Periphery Monitoring Device)

Figure 3:
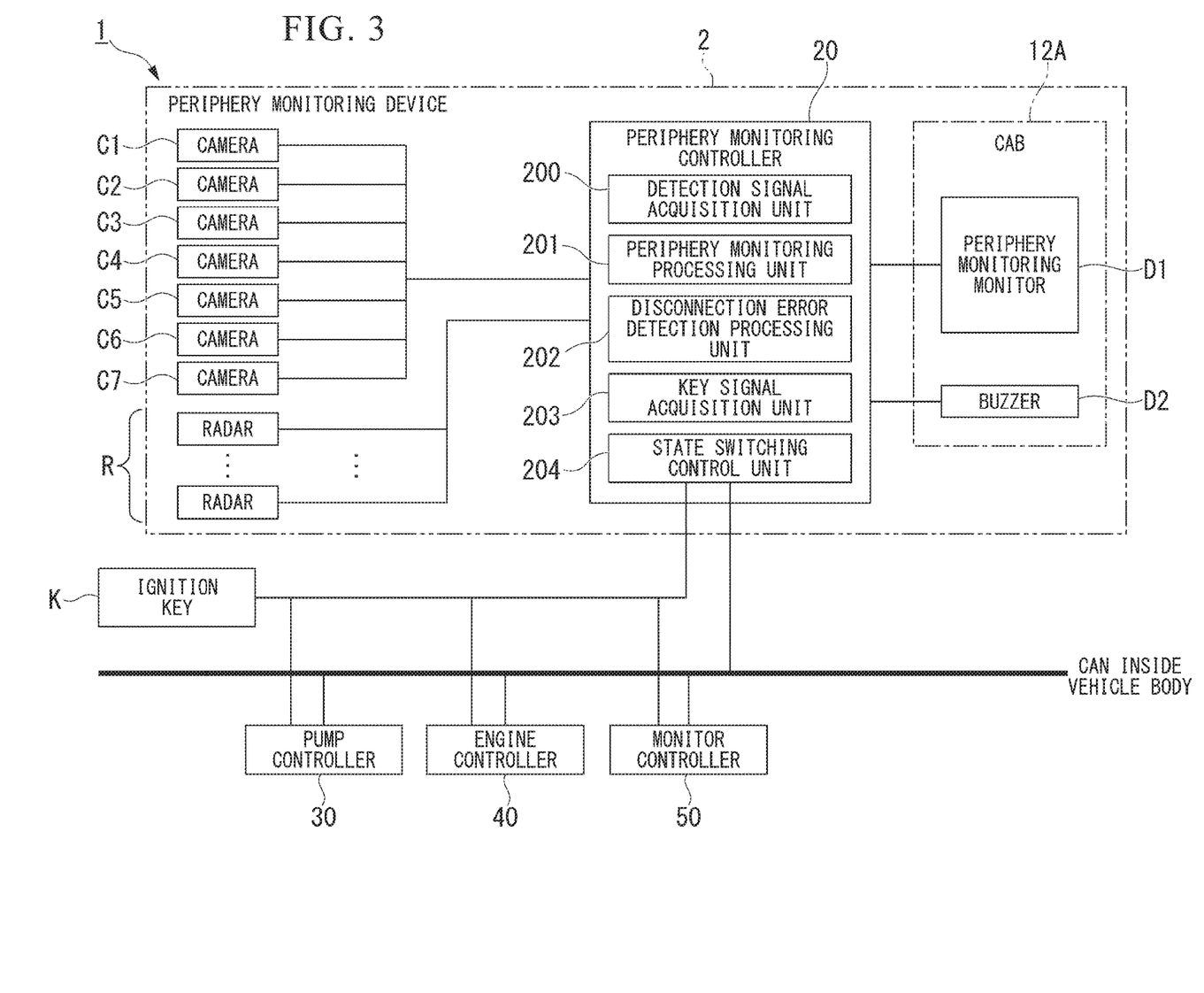
FIG. 3 is a diagram showing a functional configuration of a periphery monitoring device or the like according to the first embodiment.

FIG. 3 is a diagram showing a functional configuration of the periphery monitoring device or the like according to the first embodiment.

As shown in FIG. 3, the periphery monitoring device 2 includes a periphery monitoring controller 20, the cameras C1 to C7, the radars R, the periphery monitoring monitor D1, and the buzzer D2.

The cameras C1 to C7 and the radars R are one of the aspects of a detection device for detecting the periphery of the hydraulic shovel 1. In addition, the periphery monitoring monitor D1 and the buzzer D2 are aspects of an output device for performing predetermined output based on a signal from the detection device.

The periphery monitoring controller 20 controls entire operation of the periphery monitoring device 2. The periphery monitoring controller 20 according to the embodiment includes a CPU inside. Further, in a case where the CPU operates according to a dedicated program which operates on a general-purpose OS, various functions which will be described later are exhibited.

Specifically, the periphery monitoring controller 20 exhibits functions as a detection signal acquisition unit 200, a periphery monitoring processing unit 201, a disconnection error detection processing unit 202, a key signal acquisition unit 203, and a state switching control unit 204.

The detection signal acquisition unit 200 acquires image information acquired by the cameras C1 to C7 and detection signals from the radars R.

The periphery monitoring processing unit 201 performs a periphery monitoring process based on the detection device, which includes the cameras C1 to C7 and the radars R, and the output device which includes the periphery monitoring monitor D1 and the buzzer D2. Specifically, the periphery monitoring processing unit 201 performs a process of displaying the image information acquired through the cameras C1 to C7 on the periphery monitoring monitor D1, a process of alarming from the buzzer D2 in a case where the obstacle is detected by the radars R. In addition, the periphery monitoring processing unit 201 generates the bird's-eye image acquired by converting and uniting the respective images of the cameras C1 to C7 into a top view image.

The disconnection error detection processing unit 202 monitors communication connection among the periphery monitoring controller 20, the cameras C1 to C7, and the radars R. Specifically, in a case where the communication connection between the cameras C1 to C7 and the radars R is disconnected in a periphery monitoring mode which will be described later, the disconnection error detection processing unit 202 provides a notification about the disconnection to the operator through the periphery monitoring monitor D1 and the buzzer D2.

The key signal acquisition unit 203 acquires a key-on signal indicative of a key-on manipulation of the and a key-off signal indicative of the key-off manipulation operator with respect to the ignition key K.

The state switching control unit 204 performs a process of switching over an operation mode of the periphery monitoring device 2.

Specifically, the state switching control unit 204 controls mode switching between the periphery monitoring mode, a power-OFF mode, and a monitoring pause mode. Content and a transition condition of each operation mode will be described later.

As shown in FIG. 3, the hydraulic shovel 1 includes a pump controller 30, an engine controller 40, a monitor controller 50, and the like which are system controllers other than the periphery monitoring device 2. All of the pump controller 30, the engine controller 40, and the monitor controller 50 according to the embodiment operate on the real-time OS.

The periphery monitoring controller 20, the pump controller 30, the engine controller 40, and the monitor controller 50 are communicably connected to each other through CAN inside a vehicle body.

In addition, the periphery monitoring controller 20, the pump controller 30, the engine controller 40, and the monitor controller 50 are connected to the ignition key K. In a case where the operator performs a manipulation with respect to the ignition key K, the key-on signal or the key-off signal based on the manipulation is input to each of the periphery monitoring controller 20, the pump controller 30, the engine controller 40, and the monitor controller 50.

(Operation of Periphery Monitoring Controller)

Figure 4:
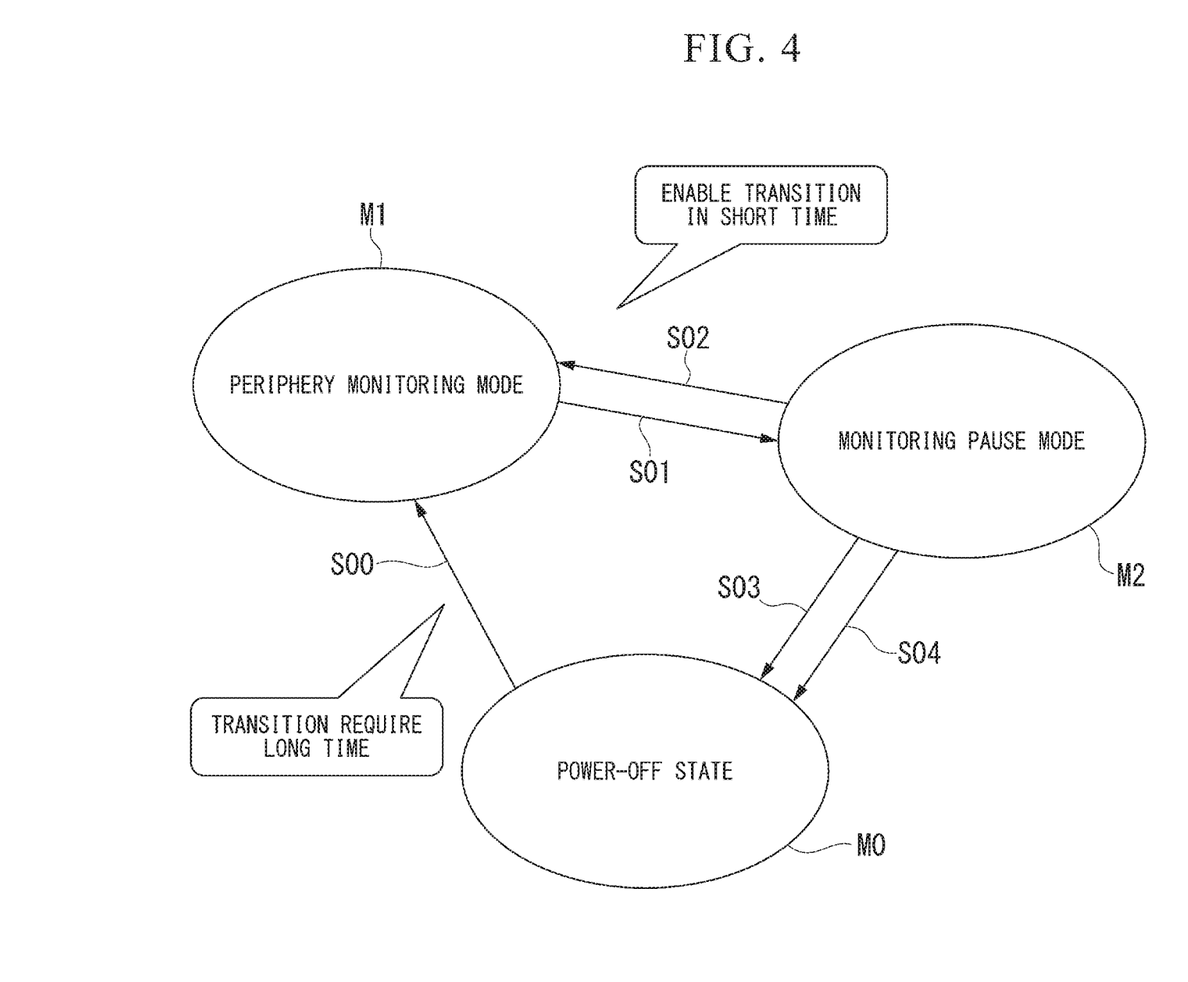
FIG. 4 is a first diagram showing an operation of a periphery monitoring controller according to the first embodiment.
Figure 5:
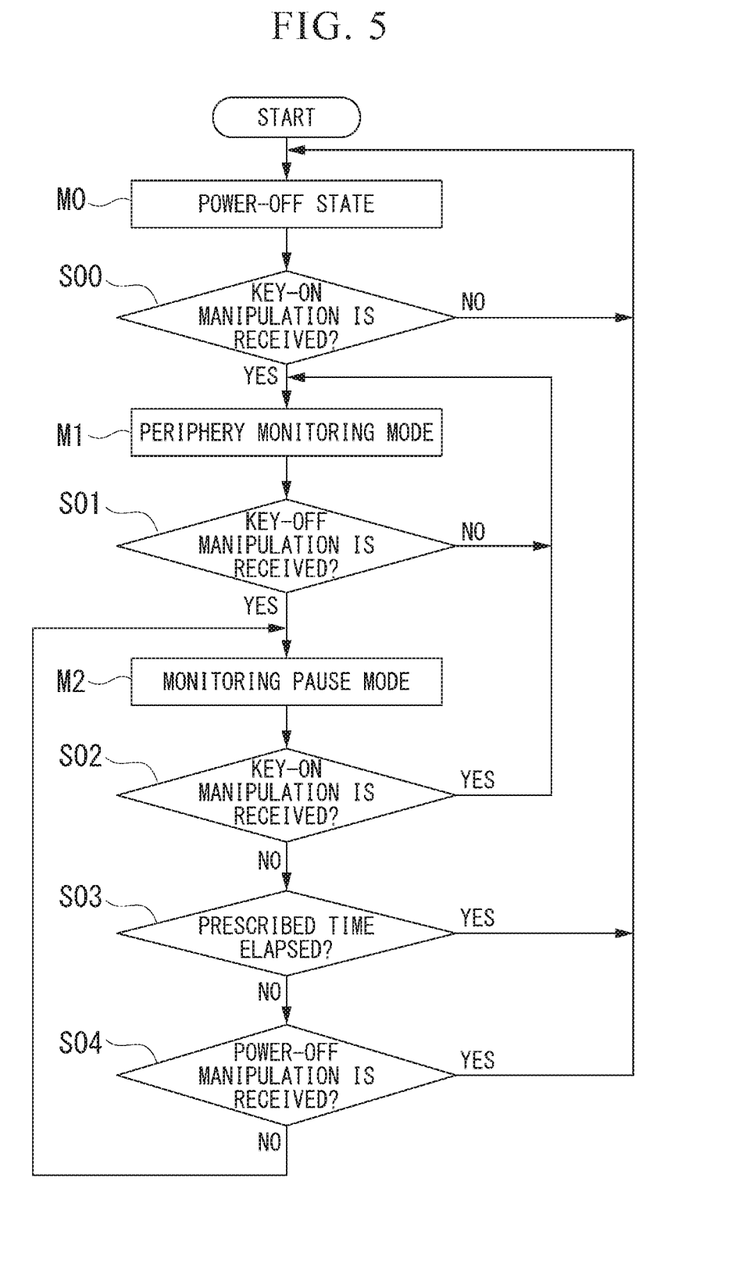
FIG. 5 is a second diagram showing the operation of the periphery monitoring controller according to the first embodiment.
Figure 6:
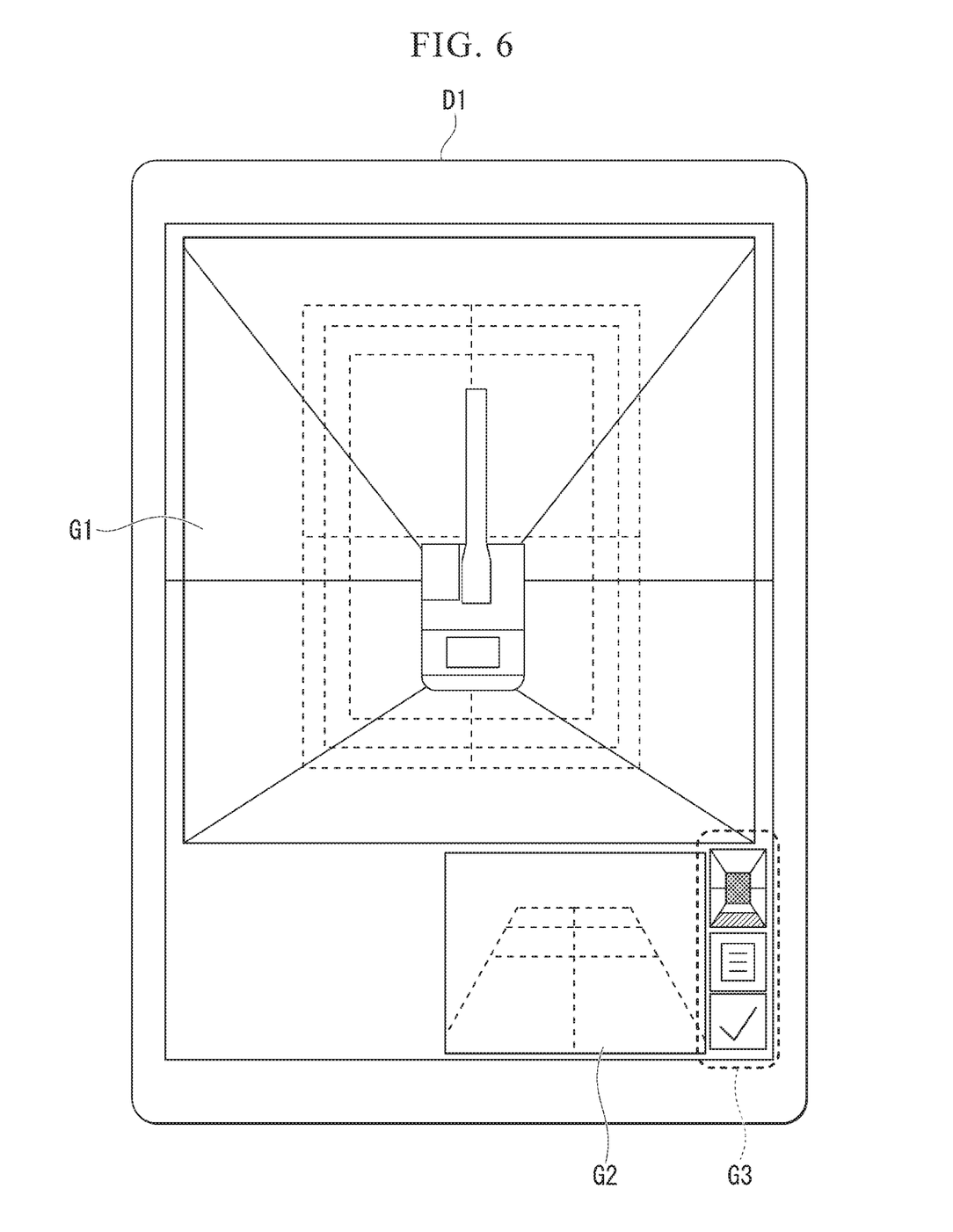
FIG. 6 is a third diagram showing the operation of the periphery monitoring controller according to the first embodiment.
Figure 7:
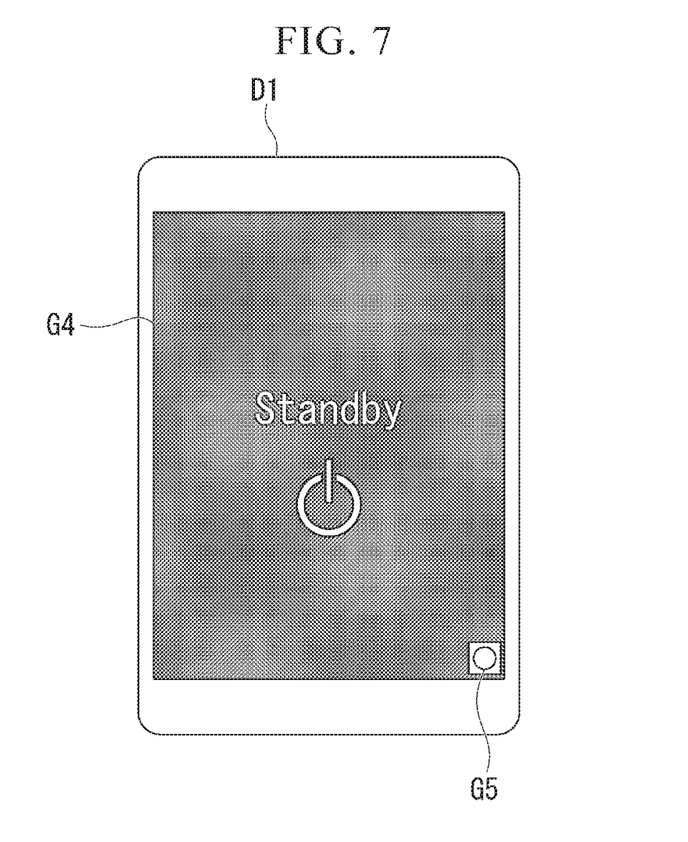
FIG. 7 is a fourth diagram showing the operation of the periphery monitoring controller according to the first embodiment.
Figure 8:
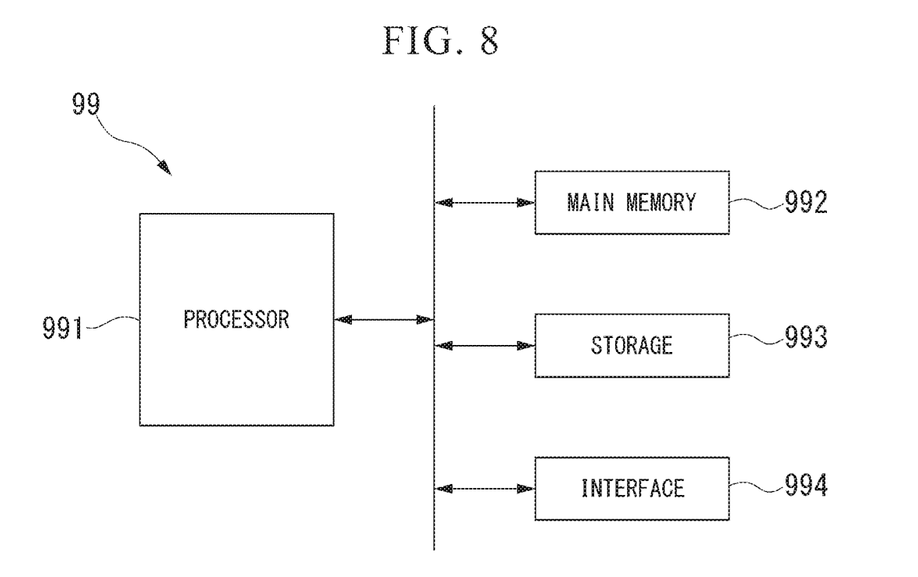
FIG. 8 is a diagram showing a configuration as a computer of the periphery monitoring controller according to the first embodiment.

FIGS. 4 to 7 are diagrams showing an operation of the periphery monitoring controller according to the first embodiment. FIG. 4 is a state transition diagram showing a mode switching process by the state switching control unit 204. FIG. 5 is a flowchart showing a flow of a process performed by the state switching control unit 204. FIGS. 6 and 7 are diagrams showing examples of images displayed on the periphery monitoring monitor D1 in respective operation modes.

Hereinafter, the flow of the process from a time point, at which the operator gets on the totally-stopped hydraulic shovel 1, will be described with reference to the state transition diagram shown in FIG. 4 and the flowchart shown in FIG. 5.

First, in the totally-stopped hydraulic shovel 1, all the components including the periphery monitoring device 2 are turned power OFF. That is, the periphery monitoring controller 20 is in a power-OFF state M0.

The power-OFF state M0 will be described. The power-OFF state M0 is a state in which the general-purpose OS is not activated in the periphery monitoring controller 20. Therefore, the periphery monitoring process or the like, which is realized by the general-purpose OS, is not performed. Accordingly, a process of activating the general-purpose OS is required to transition from the power-OFF state M0 to a periphery monitoring mode M1. In the power-OFF state M0, power consumption is seldom generated, and thus power stored in a not-shown battery, which is mounted on the hydraulic shovel 1, is not consumed.

Note that, in the power-OFF state, the periphery monitoring controller 20 is in a state in which the power supply is normally received from the battery even though the general-purpose OS is not activated. Further, in a case where the key-on manipulation which will be described later is received, the process of activating the general-purpose OS starts. Another embodiment is not limited to the aspect, and the periphery monitoring controller 20 may be in a state, in which the power supply from the battery is cut off, in the power-OFF state.

Subsequently, the operator performs the key-on manipulation with respect to the ignition key K (step S00 (key-on manipulation): YES). If so, the key-on signal is input to the periphery monitoring controller 20 from the ignition key K. In a case where the input of the key-on signal is received, the state switching control unit 204 of the periphery monitoring controller 20 executes a booting program, thereby starting the process of activating the general-purpose OS. Here, until the process of activating the general-purpose OS is completed, a time of several dozens of seconds is required. In a case where the process of activating the general-purpose OS is completed, the state switching control unit 204 causes an operation mode of the periphery monitoring controller 20 to transition to the periphery monitoring mode M1 and starts the normal periphery monitoring process.

Note that, in a case where the key-on manipulation of step S00 is performed by the operator, the key-on signal is also input to the pump controller 30, the engine controller 40, the monitor controller 50, the cameras C1 to C7, the radars R, the periphery monitoring monitor D1, and the buzzer D2, in addition to the periphery monitoring controller 20, and the pump controller 30, the engine controller 40, the monitor controller 50, the cameras C1 to C7, the radars R, the periphery monitoring monitor D1, and the buzzer D2 are simultaneously activated, respectively. Since the components operate, for example, on the real-time OS, the activation processes are completed in a shorter time than the periphery monitoring controller 20.

The periphery monitoring mode M1 will be described in detail. The periphery monitoring mode M1 is a state in which the general-purpose OS is activated in the periphery monitoring controller 20 and the periphery monitoring process by the periphery monitoring processing unit 201 of the periphery monitoring controller 20 is performed. Specifically, in the periphery monitoring mode M1, the periphery monitoring processing unit 201 of the periphery monitoring controller 20 acquires the image information from the cameras C1 to C7, converts the image information into the bird's-eye image, and displays the bird's-eye image on the periphery monitoring monitor D1. In addition, in a case where the obstacle is detected by the radars R in the periphery monitoring mode M1, the periphery monitoring processing unit 201 provides a notification about the obstacle through the buzzer D2. The above-described periphery monitoring process performed by the periphery monitoring processing unit 201 is performed based on the program which operates on the general-purpose OS.

FIG. 6 shows an example of an image which is displayed on the periphery monitoring monitor D1 by the periphery monitoring processing unit 201 in the periphery monitoring mode M1. As shown in FIG. 6, on the periphery monitoring monitor D1, a bird's-eye image G1 which is acquired by combining the images of the cameras C1 to C7, a single camera image G2 which is an image of one camera selected among the cameras C1 to C7, and the like are displayed. In addition, a manipulation panel image G3 is displayed in an area in which a touch manipulation of the operator is received. In a case where the touch manipulation with respect to manipulation panel image G3 is received from the operator, the periphery monitoring processing unit 201 changes display states (for example, an image size, image brightness, existence or non-existence of a reference line, and the like) of the bird's-eye image G1 and the single camera image G2 according to content of the touch manipulation. The bird's-eye image G1 and the single camera image G2 are aspects of the periphery monitoring image.

In addition, in the periphery monitoring mode M1, a function of the disconnection error detection processing unit 202 of the periphery monitoring controller 20 is available. That is, in the periphery monitoring mode M1, the disconnection error detection processing unit 202 monitors the communication connection with the cameras C1 to C7 and the radars R. In a case where abnormality (disconnection) is detected, the disconnection error detection processing unit 202 provides a notification about the abnormality using the periphery monitoring monitor D1, the buzzer D2, or the like.

Subsequently, it is assumed that, in the periphery monitoring mode M1, the operator performs the key-off manipulation with respect to the ignition key K (step S01 (key-off manipulation): YES). If so, the key-off signal is input from the ignition key K to the periphery monitoring controller 20. In a case where the input of the key-off signal is received, the state switching control unit 204 of the periphery monitoring controller 20 causes the operation mode to transition to a monitoring pause mode M2.

Note that, the key-off manipulation of step S01 is an aspect of a monitoring pause mode transition request which is input to the periphery monitoring controller 20.

In a case where the key-off manipulation of step S01 is performed by the operator, the key-off signal is also input to the pump controller 30, the engine controller 40, the monitor controller 50, the cameras C1 to C7, and the radars R, in addition to the periphery monitoring controller 20, and the pump controller 30, the engine controller 40, the monitor controller 50, the cameras C1 to C7, and the radars R simultaneously perform an end process, respectively, thereby becoming the power-OFF state.

The monitoring pause mode M2 will be described in detail. The monitoring pause mode M2 is a state in which the periphery monitoring process is paused while maintaining a state in which the general-purpose OS is being activated in the periphery monitoring controller 20. That is, in the monitoring pause mode M2, the periphery monitoring process by the periphery monitoring processing unit 201 and the communication monitoring process by the disconnection error detection processing unit 202 are not performed. As a result of pausing the periphery monitoring process by the periphery monitoring processing unit 201 and the communication monitoring process by the disconnection error detection processing unit 202, it is possible to stabilize the operation of the periphery monitoring controller 20 without mistakenly detecting disconnection errors of the cameras C1 to C7 and the radars R even in a case where the cameras C1 to C7 and the radars R are turned power OFF based on the key-off manipulation of step S01. Further, since the state in which the general-purpose OS is being activated is maintained, it is possible to immediately return to the periphery monitoring mode M1 based on the key-on manipulation of step S02.

Note that, the monitoring pause mode M2 may be an aspect in which a state in which a program operated on the general-purpose OS for the periphery monitoring process is being operated is maintained, or an aspect in which a state in which only the general-purpose OS is being activated is maintained and the program ends.

In addition, the monitoring pause mode M2 may be configured to not accept an input manipulation other than the key-on manipulation of step S02 and the power-OFF manipulation of step S04, which will be described later.

FIG. 7 shows an example of an image which is displayed on the periphery monitoring monitor D1 by the periphery monitoring processing unit 201 in the monitoring pause mode M2.

As shown in FIG. 7, a standby image G4, which indicates that a current operation mode is in the monitoring pause mode M2, is displayed on the periphery monitoring monitor D1. The standby image G4 is an image different from the image which is shown in FIG. 6 and which is displayed in a case of the periphery monitoring mode M1. In addition, a power-OFF manipulation panel image G5 for receiving the power-OFF manipulation, which requires transition from the monitoring pause mode to the power-OFF state by the operator, is displayed in the standby image G4. The standby image G4 is an aspect of a monitoring pause image.

Subsequently, it is assumed that, in the monitoring pause mode M2, the operator performs the key-on manipulation of the ignition key K before prescribed time T1 (for example, one hour), which is previously set, elapses (step S02 (key-on manipulation): YES). If so, the key-on signal is input to the periphery monitoring controller 20 from the ignition key K. In a case where the input of the key-on signal is received, the state switching control unit 204 of the periphery monitoring controller 20 causes the operation mode to transition from the monitoring pause mode M2 to the periphery monitoring mode M1. Here, as described above, in the monitoring pause mode M2, the state in which the general-purpose OS is being activated is maintained. Accordingly, time which is required for transition from the monitoring pause mode M2 to the periphery monitoring mode M1 is shorter than time which is required for the transition from the power-OFF state M0 to the periphery monitoring mode M1.

Note that, the state switching control unit 204 includes a not-shown timer inside. The state switching control unit 204 switches over to the mode into the monitoring pause mode M2, starts time measurement by the timer, and detects elapse of the prescribed time T1.

On the other hand, it is assumed that, in the monitoring pause mode M2, the prescribed time T1 elapses before the operator performs the key-on manipulation with respect to the ignition key K (step S03 (the prescribed time T1 elapse): YES). In this case, the state switching control unit 204 of the periphery monitoring controller 20 stops the general-purpose OS and transitions to the power-OFF state M0.

In addition, it is assumed that, in the monitoring pause mode M2, the operator performs the power-OFF manipulation before the prescribed time T1 elapses (step S04 (the power-OFF manipulation is received): YES). Here, the power-OFF manipulation is an aspect of a power-OFF transition request which is input to the periphery monitoring controller 20, and, specifically, is a touch manipulation with respect to the power-OFF manipulation panel image G5 shown in FIG. 7. In this case, the state switching control unit 204 of the periphery monitoring controller 20 immediately transitions to the power-OFF state M0 without waiting for the elapse of the prescribed time T1. For example, the operator performs the manipulation in a case where it is desired to immediately turn off power of the periphery monitoring controller after the key-off manipulation after one-day operation.

(Effects)

As above, the periphery monitoring device 2 according to the first embodiment includes the monitoring pause mode which enables transition to the periphery monitoring mode in time faster than the transition from the power-OFF state, in addition to the periphery monitoring mode and the power-OFF state.

Further, the periphery monitoring device 2 transitions to the monitoring pause mode in a case where the input of the key-off manipulation, which is the monitoring pause mode transition request, is received in the periphery monitoring mode, and the periphery monitoring device 2 transitions to the periphery monitoring mode (steps S01 and S02) in a case where the input of the key-on manipulation is received in the monitoring pause mode.

According to the configuration, the following effects are exhibited. That is, there is a case where the work machine in the mine performs maintenance around the battery during the lunch break for approximately one hour. In this case, it is necessary for the operator to perform the key-off manipulation before the maintenance work to totally stop the hydraulic shovel 1, temporarily. In this case, components, such as the pump controller 30, is turned power OFF based on the key-off manipulation. In contrast, only the periphery monitoring controller 20 transitions to the monitoring pause mode. If the operator inputs the key-on manipulation after the lunch break ends, it is possible for the periphery monitoring controller 20 in the monitoring pause mode to transition to the periphery monitoring mode in time which is shorter than the transition from the power-OFF state. After the key-on manipulation, the periphery monitoring controller 20 is launched in a short time. Therefore, it is possible for the operator to immediately check safety of the circumference and to restart the work.

From the above description, according to the periphery monitoring device 2 according to the first embodiment, it is possible to reduce time for waiting for completion of the transition to the periphery monitoring mode, and thus it is possible to improve the work efficiency.

In addition, the periphery monitoring device 2 according to the first embodiment transitions to the power-OFF state in a case where the prescribed time T1 elapses after transition to the monitoring pause mode is performed (step S03).

According to the configuration, the following effects are exhibited. That is, in a case where the periphery monitoring controller 20 is in the monitoring pause mode for a long time regardless that the key-off manipulation is input to the hydraulic shovel 1, the periphery monitoring controller 20 consumes the battery of the hydraulic shovel 1 during the time, and thus it is not preferable that the periphery monitoring controller 20 is in the monitoring pause mode for a long time. Therefore, in a case where the operator ends, for example, one-day work, it is necessary to suppressing the battery consumption during totally stop by transitioning the periphery monitoring controller 20 to the power-OFF state.

Here, with the above-described configuration, after the periphery monitoring controller 20 once transitions to the monitoring pause mode based on the key-off manipulation of the operator, the periphery monitoring controller 20 automatically transitions to the power-OFF state in accordance with the elapse of the prescribed time T1. As a result, in a case where the totally stop of the hydraulic shovel 1 is maintained for a long time, it is possible to suppress the battery consumption.

In addition, in a case where the periphery monitoring device 2 according to the first embodiment receives an input of the power-OFF manipulation, which is a transition request to the power-OFF state, in the monitoring pause mode, the periphery monitoring device 2 instantly transitions to the power-OFF state (step S04).

According to the configuration, as a result of inputting the power-OFF manipulation by the operator, it is possible to transition from the monitoring pause mode to the power-OFF state at a desired timing, and thus it is possible to suppress the battery consumption.

In addition, during the monitoring pause mode, the periphery monitoring device 2 according to the first embodiment displays the standby image G4, which indicates that the current operation mode is the monitoring pause mode, on the periphery monitoring monitor D1, which is a monitor.

In this manner, it is possible for the operator to grasp that the periphery monitoring controller 20 is in the monitoring pause mode after the key-off manipulation is performed.

In addition, the periphery monitoring device 2 according to the first embodiment goes through the monitoring pause mode M2 until the periphery monitoring device 2 transitions from the periphery monitoring mode M1 to the power-OFF state M0. In this manner, even in a case where the operator mistakenly performs the key-off manipulation, the periphery monitoring device 2 only transitions to the monitoring pause mode M2, and thus it is possible to instantly return to the periphery monitoring mode M1 and to continue the periphery monitoring.

Modified Example

Hereinabove, although the periphery monitoring device 2 according to the first embodiment is described in detail, a detailed aspect of the periphery monitoring device 2 is not limited to the above description, and it is possible to add various design modifications or the like in a scope without departing from the gist.

For example, although an aspect is described in which the periphery monitoring device 2 according to the first embodiment is described includes both the cameras C1 to C7 and the radars R as the detection device, another embodiment is not limited to the aspect. An aspect may be provided in which a periphery monitoring device 2 according to another embodiment includes only the cameras C1 to C7 or only the radars R as the detection device. In addition, an aspect may be provided in which the periphery monitoring processing unit 201 performs the obstacle detection through an image recognition process with respect to the images acquired from the cameras C1 to C7 instead of the obstacle detection using the radars R.

In addition, although an aspect is described in which the periphery monitoring device 2 according to the first embodiment includes both the periphery monitoring monitor D1 and the buzzer D2 as an output device, another embodiment is not limited to the aspect. An aspect may be provided in which the periphery monitoring device 2 according to another embodiment includes only the periphery monitoring monitor D1 or only the buzzer D2 as the output device. In addition, as another aspect of the output device, a safety device or the like may be provided which compulsorily stops the operation of the hydraulic shovel 1 based on the signal from the detection device. In addition, an output by the buzzer D2 may be an output using voice.

In addition, although the periphery monitoring device 2 according to the first embodiment is described such that the bird's-eye image G1 and the standby image G4 are displayed on the touch panel monitor D1 which is provided in the cab 12A of the hydraulic shovel 1, another embodiment is not limited to the aspect. The periphery monitoring device 2 according to another embodiment may display the bird's-eye image G1, the standby image G4, or the like, on a so-called mobile terminal device, such as a smart phone or a tablet, a wearable terminal, a remote control display in a work machine which can be manipulated by remote control, or the like.

In addition, although the periphery monitoring device 2 according to the first embodiment is described such that transition to the power-OFF state is immediately performed in a case where the power-OFF manipulation panel image G5 displayed on the periphery monitoring monitor D1 is touched in the monitoring pause mode, another embodiment is not limited to the aspect. An aspect may be provided in which the periphery monitoring device 2 according to another embodiment immediately transitions to the power-OFF state, for example, in a case where a press of a button separately provided in the hydraulic shovel 1 is input.

In addition, in this case, the button may be provided, for example, in a periphery of a lifting ladder which is used in a case where the operator gets on and off the hydraulic shovel 1. In this manner, it is possible for the operator to cause the periphery monitoring controller 20 to immediately transition to the power-OFF state even after disembarking from the hydraulic shovel 1 through the lifting ladder. Therefore, for example, even though it is not certain whether or not the periphery monitoring controller 20 transitions to the power-OFF state by the touch manipulation with respect to the periphery monitoring monitor D1 after disembarking from the hydraulic shovel 1, it is possible for the operator to securely transition to the power-OFF state on the spot without returning to the cab 12A on purpose.

In addition, the periphery monitoring device 2 according to another embodiment may be capable of variably setting the prescribed time T1 based on the manipulation of the operator. In this manner, for example, it is possible to appropriately set the duration of the monitoring pause mode according to time such as the lunch break.

In addition, although an aspect is described in which the periphery monitoring controller 20 according to the first embodiment is a single device including one housing, another embodiment is not limited to the aspect. For example, an aspect may be provided in which the periphery monitoring controller 20 according to another embodiment is dispersedly included in two or more devices to which the various functional units shown in FIG. 3 are connected through a predetermined communication network (for example, a vehicle body CAN).

In addition, although an example is described in which the periphery monitoring device 2 according to the first embodiment is mounted on the hydraulic shovel 1 as an aspect of the work machine, another embodiment is not limited to the aspect. An aspect may be provided in which the periphery monitoring device 2 according to another embodiment is mounted on a work machine (a wheel loader, a bulldozer, a dump truck, a grader, or the like) other than the hydraulic shovel 1. In addition, the periphery monitoring device 2 may be applied to not only a work machine which performs work in the mine but also a work machine which performs work in a construction site.

In addition, in a case where the work machine is connected to a control system through a wireless network or the like, it is possible to control the work machine using a signal from the control system. In this case, the periphery monitoring controller 20 may perform mode switching on the periphery monitoring device 2 based on the key-on manipulation and the key-off manipulation which are input on a side of the control system.

In addition, although an aspect is described in which the ignition key K of the hydraulic shovel 1 according to the first embodiment includes a key insertion hole as shown in FIG. 2, another embodiment is not limited thereto. That is, the ignition key may not include the key insertion hole, and may be, for example, a keyless dial type, a push button type, or a manipulation type using a mobile terminal. Note that, in such aspect, a manipulation of turning the dial, a manipulation of pushing the push button, a manipulation by the mobile terminal, or the like are included in the above-described "key-on manipulation" and "key-off manipulation".

In addition, although the periphery monitoring device 2 according to the first embodiment is described such that the standby image G4 is displayed on the periphery monitoring monitor D1 while maintaining a state in which the power of the periphery monitoring monitor D1 is turned on in the monitoring pause mode M2, another embodiment is not limited to the aspect. That is, the periphery monitoring device 2 according to another embodiment may turn off the power of the periphery monitoring monitor D1 or the buzzer D2 in the monitoring pause mode M2.

(Configuration of Computer)

FIG. 7 shows a configuration of the periphery monitoring controller according to the first embodiment as a computer.

A computer 99 includes a processor 991, a main memory 992, storage 993, and an interface 994.

The above-described periphery monitoring controller 20 according to the first embodiment each includes the computer 99. Each of the functional units included in each periphery monitoring controller 20 is stored as a program in the storage 993. According to the processes such that the processor 991 reads the program from the storage 993, loads the program in the main memory 992, and operates according to the program, functions as the various functional units shown in FIGS. 2 and 3 are exhibited. The storage 993 is an example of a medium in a format which is not temporary. As another example of the medium in the format which is not temporary, an optical disk, a magnetic disk, a magneto-optic disk, and a semiconductor memory, which are connected through the interface 994, are considered.

Note that, in the power-OFF state, the general-purpose OS is previously recorded in a predetermined area of the storage 993. In a case where the key-on manipulation performed by the operator is received, the CPU 991 operates according to a predetermined booting program, thereby starting the process of activating the general-purpose OS.

The program may be delivered to the computer 99 through a network. In this case, the computer 99 deploys the delivered program in the main memory 992, and performs the process. The program may be provided to realize some of the above-described functions. For example, the program may be realized through a combination with another program which previously stores the above-described functions in the storage 993, or combination with another program which is mounted on another device. In addition, some of the above-described functions may be performed by another device connected through the network. That is, the above-described functions may be realized by cloud computing, grid computing, cluster computing, or another parallel computing.

The computer 99 may include a Programmable Logic Device (PLD) in addition to the above configuration or instead of the above configuration. A Programmable Array Logic (PAL), a Generic Array Logic (GAL), a Complex Programmable Logic Device (CPLD), and a Field Programmable Gate Array (FPGA) are examples of the PLD.

Hereinabove, although some embodiments of the present invention are described, the embodiments are provided as examples and do not intend to limit the scope of the invention. The embodiments are possible to be performed in other various forms, and various omissions, replacements, changes are possible in the scope without departing from the gist of the invention. In the same way that the embodiments and modifications are included in the scope and the gist of the invention, the embodiments and modifications are included in the invention disclosed in claims and equivalent scopes.

In the embodiments, a form is described in which the periphery monitoring monitor D1 is installed in the cab 12A of the hydraulic shovel 1. However, the invention is not limited to the example. In another embodiment, for example, the periphery monitoring monitor D1 may be provided on a periphery of a not-shown remote manipulation seat which is installed on the outside of the work equipment 110.

In the embodiments, a form is described in which the periphery monitoring controller 20 includes the periphery monitoring mode or the monitoring pause mode, the invention is not limited to the example. For example, in a controller which operates on the general-purpose OS for the purpose of control other than periphery monitoring, a controller may be provided which includes a switching unit that switches over the operation mode, the pause mode, and the power-OFF state, and which transitions to the operation mode in time faster than the transition from the power-OFF state to the operation mode in a case where the pause mode transitions to the operation mode.

In addition, in FIG. 3 of the embodiment, the controller which operates on the real-time OS is exemplified as a controller other than the periphery monitoring controller 20, the invention is not limited to the example, and another controller which operates on the general-purpose OS may be included. Further, another controller may be a controller which transitions to the operation mode in time faster than the transition from the power-OFF state to the operation mode in a case of transitioning from the pause mode to the operation mode. Note that, in another controller, the pause mode corresponds to the monitoring pause mode of the embodiment, and the operation mode corresponds to the periphery monitoring mode of the embodiment.

In the embodiment, a form is described in which the periphery monitoring controller 20 is operated by the general-purpose OS. However, the invention is not limited to the example. For example, the periphery monitoring controller 20 may perform the same operation as in the embodiment by the real-time OS. The reason for this is that, even in a case where the real-time OS is used, the same problem exists as in the case where the general-purpose OS is used. Note that, the operating system includes a general-purpose OS and the real-time OS.

INDUSTRIAL APPLICABILITY

According to the periphery monitoring device of the present invention, it is possible to improve work efficiency by a work machine.

The invention claimed is:
1. A periphery monitoring device comprising:
a detection device configured to detect a periphery of a work machine;
an output device configured to perform a predetermined output based on a signal from the detection device; and
a state switching control unit configured to control state switching among a plurality of modes that include:
a periphery monitoring mode in which an operating system is being activated and a periphery monitoring process based on the detection device and the output device is performed on the operating system,
a monitoring pause mode in which the periphery monitoring process is not performed while maintaining a state in which the operating system is being activated, and
a power-OFF state in which the operating system is not activated and the periphery monitoring process is not performed,
wherein a first period of time for transitioning from the monitoring pause mode to the periphery monitoring mode is shorter than a second period of time for transitioning from the power-OFF state to the periphery monitoring mode, and
wherein the state switching control unit is configured to:
transition to the monitoring pause mode based on an input of a key-off manipulation with respect to the work machine being received in the periphery monitoring mode, and
transition to the power-OFF state based on an elapse of a prescribed time after transitioning to the monitoring pause mode.
2. The periphery monitoring device according to claim 1, wherein the state switching control unit is configured to transition to the periphery monitoring mode for the first period of time based on an input of a key-on manipulation with respect to the work machine being received in the monitoring pause mode.

3. The periphery monitoring device according to claim 1, wherein the state switching control unit is configured to transition to the power-OFF state based on an input of a power-OFF transition request being received in the monitoring pause mode.

4. The periphery monitoring device according to claim 1, wherein the state switching control unit is configured to display, on the output device, an image indicating that a current operation mode is the monitoring pause mode.

5. A work machine comprising the periphery monitoring device according to claim 1.

6. The periphery monitoring device according to claim 1, wherein the state switching control unit is configured to, based on an input of a power-OFF transition request being received in the monitoring pause mode, transition to the power-OFF state without waiting for the elapse of the prescribed time.

7. The periphery monitoring device according to claim 1, wherein the output device is configured to, during the periphery monitoring mode, output a notification related to a disconnection error of the detection device that is detected by a disconnection error detection processing, and
wherein the disconnection error detection processing is not performed during the monitoring pause mode.

8. A periphery monitoring control method, comprising:
transitioning to a periphery monitoring mode in which an operating system is being activated and a periphery monitoring process based on a detection device and an output device is performed, by receiving an input of a key-on manipulation with respect to a work machine in a power-OFF state in which the operating system is not activated;
transitioning to a monitoring pause mode in which the periphery monitoring process is not performed while maintaining a state in which the operating system is being activated, by receiving an input of a key-off manipulation with respect to the work machine in the periphery monitoring mode;
transitioning to the periphery monitoring mode based on receiving an input of a key-on manipulation with respect to the work machine in the monitoring pause mode; and
transitioning to the power-OFF state based on an elapse of a prescribed time after transitioning to the monitoring pause mode,
wherein a first period of time for transitioning from the monitoring pause mode to the periphery monitoring mode is shorter than a second period of time for transitioning from the power-OFF state to the periphery monitoring mode.

9. A display device that is configured to:
display, in a periphery monitoring mode, a periphery monitoring image captured by a camera included in a work machine,
display, in a monitoring pause mode, a monitoring pause image that is different from the periphery monitoring image based on an input of a key-off manipulation with respect to the work machine being received in the periphery monitoring mode, and
transition from the monitoring pause mode in which the monitoring pause image is displayed to the periphery monitoring mode in which the periphery monitoring image is displayed based on an input of a key-on manipulation with respect to the work machine being received in the monitoring pause mode,
transition to the monitoring pause mode based on the input of the key-off manipulation with respect to the work machine being received in the periphery monitoring mode, and
transition to a power-OFF state based on an elapse of a prescribed time after transitioning to the monitoring pause mode,
wherein a first period of time for transitioning the monitoring pause mode to the periphery monitoring mode is shorter than a second period of time for transitioning from the power-OFF state to the periphery monitoring mode.

* * * * *